US008223466B2

(12) United States Patent
Roscoe

(10) Patent No.: US 8,223,466 B2
(45) Date of Patent: Jul. 17, 2012

(54) ARC FLASH DETECTION

(75) Inventor: George William Roscoe, West Hartford, CT (US)

(73) Assignee: General Electric Company, Schenectady, NY (US)

( * ) Notice: Subject to any disclaimer, the term of this patent is extended or adjusted under 35 U.S.C. 154(b) by 285 days.

(21) Appl. No.: 12/494,648

(22) Filed: Jun. 30, 2009

(65) Prior Publication Data

US 2010/0328824 A1    Dec. 30, 2010

(51) Int. Cl.
*H02H 3/00* (2006.01)
(52) U.S. Cl. ............. 361/42; 361/93.1; 361/111
(58) Field of Classification Search ........ 361/42, 361/43, 93.1, 111; 702/58; 356/51
See application file for complete search history.

(56) References Cited

U.S. PATENT DOCUMENTS

| | | | | |
|---|---|---|---|---|
| 3,899,996 | A * | 8/1975 | Park ............................ 118/720 |
| 4,369,364 | A * | 1/1983 | Kuntermann ............. 250/227.11 |
| 4,791,518 | A * | 12/1988 | Fischer ............................ 361/2 |
| 6,614,983 | B2 * | 9/2003 | Wu et al. ....................... 385/140 |
| 6,806,471 | B2 * | 10/2004 | Matsukuma et al. ..... 250/339.15 |
| 7,821,749 | B2 * | 10/2010 | Asokan et al. .................... 361/1 |
| 2005/0029326 | A1 * | 2/2005 | Henrikson ....................... 228/8 |
| 2008/0094612 | A1 * | 4/2008 | Land ............................. 356/51 |
| 2008/0239598 | A1 * | 10/2008 | Asokan et al. .................. 361/56 |
| 2009/0161272 | A1 * | 6/2009 | Asokan et al. .................. 361/43 |
| 2010/0066470 | A1 * | 3/2010 | Harmon ....................... 335/174 |
| 2010/0072352 | A1 * | 3/2010 | Kesler et al. .................. 250/216 |
| 2010/0073830 | A1 * | 3/2010 | Schweitzer, III ............... 361/42 |
| 2010/0073831 | A1 * | 3/2010 | Schweitzer, III ............... 361/42 |
| 2010/0321838 | A1 * | 12/2010 | Wu et al. ........................ 361/42 |

OTHER PUBLICATIONS

Assessing the Need for Personal Protective Equipment (PPE), [online]; [retrieved on Jun. 24, 2009]; retrieved from the Internet http://www.osha.gov/desp/ote/library/ppe_assessment/ppe_assessment.html.
IEEE Industry Applications Society. 1584—IEEE Guide for Performing Arc Flash Calculations. IEEE. 2002. New York.
Mauro, J.A., Optical Engineering Handbook, GE, 1963, United States.

* cited by examiner

*Primary Examiner* — Patrick Salce
(74) *Attorney, Agent, or Firm* — Cantor Colburn LLP

(57) ABSTRACT

An arc flash detector includes a light sensor, a light attenuating filter in communication with the light sensor, a housing disposed to support the light attenuating filter and the light sensor, and a logic circuit in communication with the light sensor. The logic circuit is disposed to receive an output of the light sensor and disposed to produce an output signal responsive to a predetermined intensity of light received by the light sensor. The light attenuating filter is disposed to reduce the intensity of light received by the light sensor. The housing is also disposed to retain the light sensor and the light attenuating filter at a fixed orientation.

22 Claims, 8 Drawing Sheets

ARC FLASH DETECTION

BACKGROUND OF THE INVENTION

The subject matter disclosed herein relates to arc flash detection and mitigation technologies, and particularly relates to detection devices for this purpose.

Electric power circuits and switchgear have conductors separated by insulation. Air space often serves as part or all of this insulation in some areas. If the conductors are too close to each other or voltage exceeds the insulation properties, an arc can occur between conductors. Air or any insulation (gas or solid dielectrics) between conductors can become ionized, making it conductive, which enables arcing. Arc temperature can reach as high as 20,000° C., vaporizing conductors and adjacent materials, and releasing significant energy.

Arc flash is the result of a rapid energy release due to an arcing fault between phase-phase, phase-neutral, or phase-ground. An arc flash can produce high heat, intense light, pressure waves, and sound/shock waves. However, the arc fault current is usually much less than a short circuit current, and hence delayed or no tripping of circuit breakers is expected unless the breakers are selected to handle an arc fault condition. Agencies and standards such as the National Environmental Policy Act (NEPA), Occupational Safety and Health Administration (OSHA), and Institute of Electrical and Electronics Engineers (IEEE) regulate arc flash issues through personal protective clothing and equipment, but there is no device established by regulation to eliminate arc flash.

Standard fuses and circuit breakers typically do not react quickly enough to an arc flash. To provide a safety mechanism with sufficiently rapid response, there are common arc flash mitigation devices, such as the electrical "crowbar," utilize mechanical and/or electromechanical processes. For example, an electrical crowbar is a protection device that intentionally shorts an electrical circuit and thus diverts the electrical energy away from the arc flash. The intentional 3-phase short circuit fault thus created is then cleared by tripping a fuse or circuit breaker, and shutting down the power. However, such intentional short circuits may allow significant levels of current resulting from the intentional short-circuit. Regardless of the arc mitigation mechanism, there is a need in the art for an arc flash detection arrangement that can distinguish between arc flash events from normal or expected operation.

Radiation sensors can be used to detect the presence of radiation in various electromagnetic spectrum regimes. However, such sensors tend to be sensitive to relatively low light levels and so, when employed to detect radiation associated with an arc flash event, will tend to detect non-arc-flash radiation, so called "nuisance light," such as sunlight, flashlights, room lights, and the like, which vary in intensity from about 500 lux (flashlight) to about 2,000 lux (commercial space lighting) to about 80,000 lux (direct sunlight).

Lux is a desired measurement as lux is proportional to measuring meters for distance. The further away the light source is from a sensor, the more significant the intensity diminishes. For example, if it is assumed impendent light was impinged on a volume of a cube for every meter out the distance extended, the intensity of the light would drop off by a square factor of the distance. Atmospheric and obstacles could change that estimation. Some light sources such as flashlights dissipate relatively quickly, while sunlight has little change with distance. By using lux as the value of light measured at a sensor, the use of a light meter (e.g., lux meter) to calibrate and verify sensor outputs is possible.

In addition, most sensors become saturated well below the level at which an arc flash event would be emitting. For example, a typical arc flash event will produce radiation in the visible spectrum with luminous flux on the order of 100,000 lux at 3-4 feet from the arc flash event, while most point light sensors saturate at 700 lux or less. Thus, there is a need for a radiation sensor that can discriminate between nuisance light and radiation produced by an arc flash event while maintaining sensitivity in the required range.

BRIEF DESCRIPTION OF THE INVENTION

According to one aspect of the invention, an arc flash detector includes a light sensor, a light attenuating filter in communication with the light sensor, a housing disposed to support the light attenuating filter and the light sensor, and a logic circuit in communication with the light sensor. The logic circuit is disposed to receive an output of the light sensor and disposed to produce an output signal responsive to a predetermined intensity of light received by the light sensor. The light attenuating filter is disposed to reduce the intensity of light received by the light sensor. The housing is also disposed to retain the light sensor and the light attenuating filter at a fixed orientation.

According to another aspect of the invention, a power equipment protection system includes a cabinet, a circuit interrupter in the cabinet, and an arc flash detector. The circuit interrupter is positioned within the cabinet. The circuit interrupter includes a line terminal arranged for connection to a line conductor and a load terminal arranged for connection to a load conductor, the circuit interrupter further includes a first contact connected to one of the line and load terminals, a second contact connected to the other of the line and load terminals, an operating mechanism connected to at least one of the first and second contacts so as to selectively place the first and second contacts into and out of engagement with each other, and a trip device connected to the operating mechanism such that when tripped, the trip device causes the operating mechanism to disengage the first and second contacts. The arc flash detector is in communication with the trip device and is disposed to actuate the trip device in response to an arc flash event. The arc flash detector includes a light sensor and a light attenuating filter, the light attenuating filter is disposed to reduce the intensity of light received by the light sensor.

According to yet another aspect of the invention, a power equipment protection system comprising a logic circuit connected to a light sensor, a light attenuating filter covering the light sensor such that ambient light is attenuated by a predetermined percentage before reaching the light sensor, the logic circuit comprising a processor connected to a computer readable storage medium containing computer executable code that, when read and executed by the processor, causes the logic circuit to perform a method. The method includes monitoring an output signal of the light sensor and producing an arc flash event signal if the output signal of the light sensor exceeds a predetermined level.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
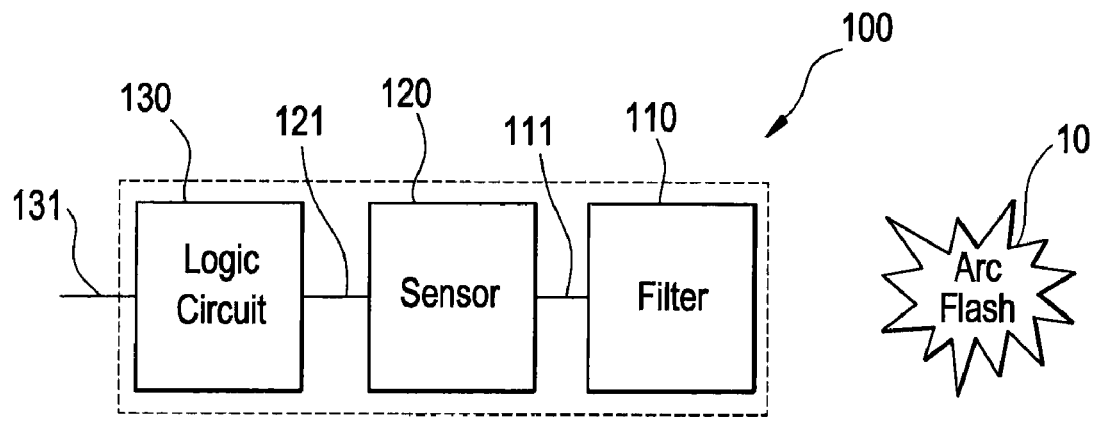
FIG. 1 is a schematic illustration of an arc flash detector according to an embodiment disclosed herein.

As schematically illustrated in FIG. 1, an arc flash detector 100 according to an embodiment disclosed herein includes a light attenuating filter 110, a light sensor 120, and a logic circuit 130. Ambient light enters the light attenuating filter 110, which attenuates the ambient light by a predetermined percentage. The attenuated ambient light travels from the light attenuating filter 110 to the light sensor 120. If the attenuated ambient light is of sufficient intensity to saturate the light sensor 120, the light sensor 120 sends an output signal to the logic circuit 130. The logic circuit 130 evaluates the output signal of the light sensor 120 and produces an output signal of its own if it determines that an arc flash event has occurred. The output signal of the logic circuit 130 is then used by another device to stop the arc flash, to alert an operator, and/or take other action. For example, the light sensor may be powered through a power supply connected thereto. Further, the power supply may be in communication with a line voltage supplying said power supply with a voltage (e.g., a line voltage may also be supplied to the circuit breaker(s) where arc flashes may occur). The logic circuit may also be in communication with the line voltage (e.g., through the power supply or an additional power supply) and if an arc is present, the logic circuit transmits a signal to a processor (not illustrated for simplicity) which determines if there is an arc flash event present. The processor may have an AND operand which also looks for other characteristics that may also indicate arc flash such as current, sound, pressure, heat or other suitable parameters provided by any other suitable sensor. It is noted however, that the logic circuit may be used only as illustrated for simplicity in circuit design as well as in combination with said processor.

As indicated above, the light attenuating filter 110 reduces the strength of the ambient light, measured in units of luminous flux or lux, striking the light sensor 120 by a predetermined or desired percentage. This attenuation allows the detector 100 to discriminate between nuisance light and arc flash events. It is noted that two known light sources may be so bright that light filtration won't be successful, for example, sunlight, and more recently certain circuit breakers (e.g., with open venting). Additionally, arc flash tends to have a wider range of light compared to light emitted from open venting circuit breakers, thus filtering may be successful. With regards to the percentage, the predetermined or desired percentage is selected so that only light that exceeds a predetermined level can reach the light sensor. The predetermined level of light is based on the amount of light needed to effect saturation of the light sensor 120. Thus, for a light sensor 120 with a saturation point of 700 lux, the predetermined percentage should allow at least 700 lux to pass through the light attenuating filter 110 during an arc flash event. In this determination, a minimum arc flash light output level can be used to ensure that all arc flash events will saturate the light sensor 120. While direct sunlight can be as strong as 80,000 lux, it is unlikely to strike the detector in a typical usage environment, so a lower minimum intensity, such as about 50,000 lux, is sufficient to detect all arc flashes while eliminating detection of nuisance light, in embodiments. In other embodiments, a minimum intensity of about 10,000 lux is effective.

The predetermined percentage of attenuation in embodiments is between from about 30% to about 99.9999%, depending on the light sensor employed and minimum light intensity to be detected. In an embodiment, the predetermined percentage of attenuation is from about 90.0% to about 99.6%, allowing from about 0.4% to about 10% of the ambient light to strike the light sensor 120. Thus, in an arc flash 10 producing 100,000 lux, only from about 400 lux to about 10,000 lux strikes the light sensor 120. In another embodiment, the predetermined percentage is from about 96.0% to about 99.0%, allowing from about 1% to about 4% of the ambient light to strike the light sensor 120. Thus, in an arc flash event 10 producing 100,000 lux, only from about 1,000 lux to about 4,000 lux strikes the light sensor 120.

A suitable material for the light attenuating filter 110 is welding shade material, in embodiments. Welding shades are available in a range of attenuation as illustrated in Table 1. In Table 1, the attenuation is expressed in transmittance, representing a percentage of light allowed to pass through the shade.

TABLE 1

Welding Shade Grade vs. Transmittance

| Shade | Max (%) | Type (%) | Min (%) |
| --- | --- | --- | --- |
| 3.0 | 22.9 | 13.9 | 8.7 |
| 4.0 | 8.51 | 5.18 | 3.24 |
| 5.0 | 3.16 | 1.93 | 1.2 |
| 6.0 | 1.18 | 0.72 | 0.45 |
| 7.0 | 0.44 | 0.27 | 0.17 |
| 8.0 | 0.162 | 0.1 | 0.062 |
| 9.0 | 0.06 | 0.037 | 0.023 |
| 10 | 0.0229 | 0.0139 | 0.0087 |
| 11 | 0.0085 | 0.0052 | 0.0033 |
| 12 | 0.0032 | 0.0019 | 0.0012 |
| 13 | 0.00118 | 0.00072 | 0.00045 |
| 14 | 0.00044 | 0.00027 | 0.00017 |

In some embodiments, a shade 5 material is effective, while in other embodiments, shade 4 and shade 6 material is effective.

In the schematic example shown in FIG. 1, a first path 111 connects the light attenuating filter 110 and the light sensor 120. The first path 111 is any suitable light transmitting medium by which attenuated ambient light from the light attenuating filter 110 can travel to the light sensor 120, such as, for example, a fluid, vacuum, or a light conducting solid, such as glass or plastic.

Additionally, a second path 121 in the schematic example of FIG. 1 connects the light sensor 120 to the logic circuit 130. Since the typical light sensor 120 produces an electrical output signal, the second path 121 in embodiments is typically an electrical conductor. It is within the scope of embodiments that the light sensor 120 could generate an output signal of a different form, and the second path 121 would be a suitable medium for carrying the output signal. For example, the light sensor 120 could emit an ultrasonic signal carried by a fluid or solid, a radio frequency signal carried by the surrounding space, or even a mechanical signal carried by a linkage or the like.

A third path 131 is shown in the schematic example of FIG. 1 as leading from the logic circuit 130 and carries the output signal of the logic circuit 130. Where the output signal of the logic circuit 130 in embodiments is an electrical signal, the third path 131 is a conductor. It is within the scope of embodiments that other types of signals could be produced by the logic circuit 130, such as light, radio frequency or other electromagnetic radiation, or sound, and the third path 131 will be an appropriate medium for the type of signal produced. For example, if the output signal of the logic circuit 130 is a radio frequency signal, then the third path 131 is whatever lies between the logic circuit 130 and the target of the output signal that is suitable for propagating a radio frequency signal.

Figure 2:
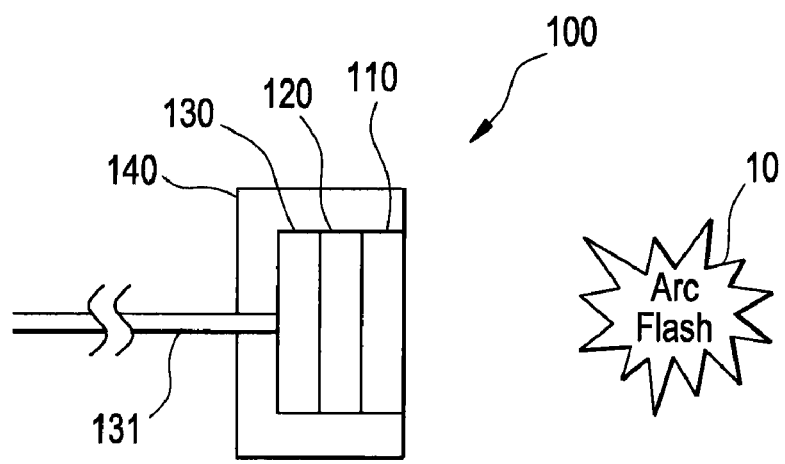
FIG. 2 is a schematic illustration of an arc flash detector according to an embodiment disclosed herein.

In embodiments, as seen schematically in FIG. 2, a housing 140 holds the light attenuating filter 110 in front of the light sensor 120 at a predetermined or desired spacing/distance and/or a fixed orientation. The logic circuit 130 is also held within the housing 140 in close proximity to the light sensor 120, and the third path 131, such as a wire, exits the housing 140 at an end opposite the end in which the light attenuating filter 110 is held. The first path 111 is at most a small gap that can be evacuated and/or filled with air or another gas, though embodiments employ direct contact between the light attenuating filter 110 and the light sensor 120. The first path 111 can also be a light transmitting adhesive applied between the light attenuating filter 110 and the light sensor 120 or an optical waveguide. The second path 121 is an electrical connection, such as a solder joint or wire, though other appropriate connections can be employed.

Figure 3:
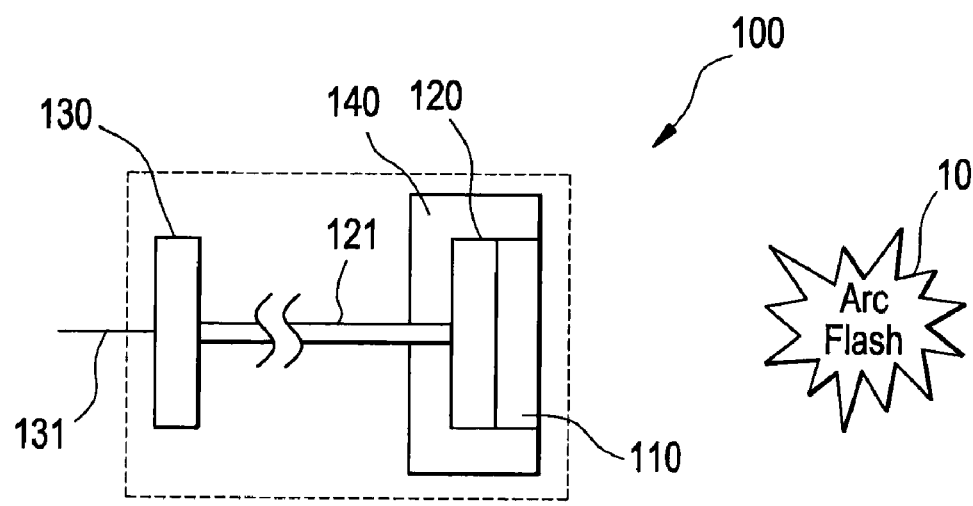
FIG. 3 is a schematic illustration of an arc flash detector according to an embodiment disclosed herein.

As shown schematically in FIG. 3, the logic circuit 130 need not be contained within the housing 140. The housing 140 can hold the light attenuating filter 110 and light sensor 120 as in the embodiment of FIG. 2, but the second path 121, such as an electrical conductor, exits the housing to connect the light sensor 120 to the logic circuit 130. The logic circuit 130 can be located in its own housing, or in another piece of equipment as required for a particular application. The third path 131, such as an electrical conductor, connects the logic circuit 130 to a device that will respond to the output signal of the logic circuit when it is produced.

Figure 4:
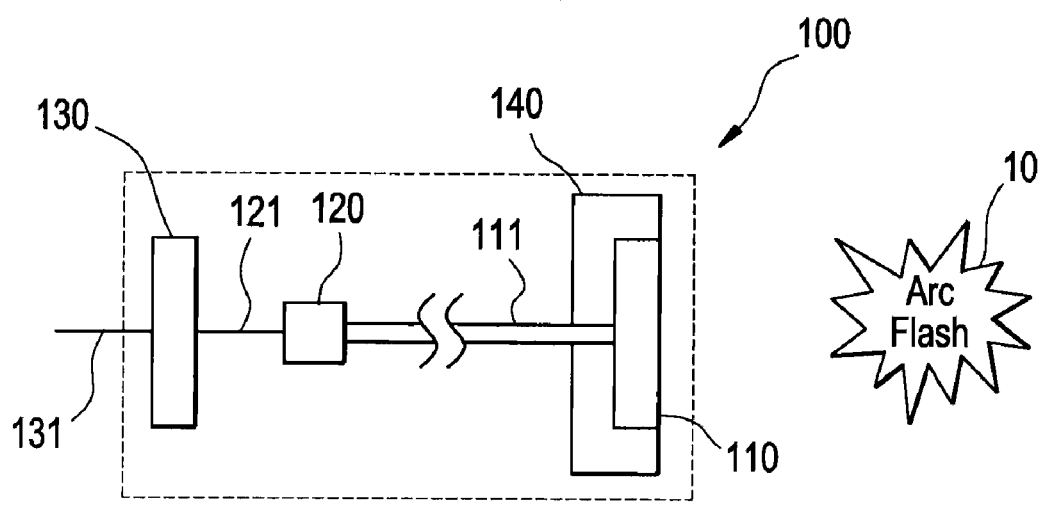
FIG. 4 is a schematic illustration of an arc flash detector according to an embodiment disclosed herein.

FIG. 4 shows schematically that the light sensor 120 can also be removed from the housing 140. As seen in FIG. 4, the housing 140 holds the light attenuating filter 110, and the first path 111 exits the housing 140 to connect the light attenuating filter 110 and the light sensor 120. In this example, the first path 110 is a light transmitting medium, such as a fiber optic cable, that carries attenuated ambient light from the light attenuating filter 110 to the light sensor 120. The light sensor 120, second path 121, and logic circuit 130 can be housed in their own housing, or the light sensor 120 and the logic circuit 130 can each have their own housing, or other arrangements can be used so long as the function of the components is substantially unaffected.

Figure 5:
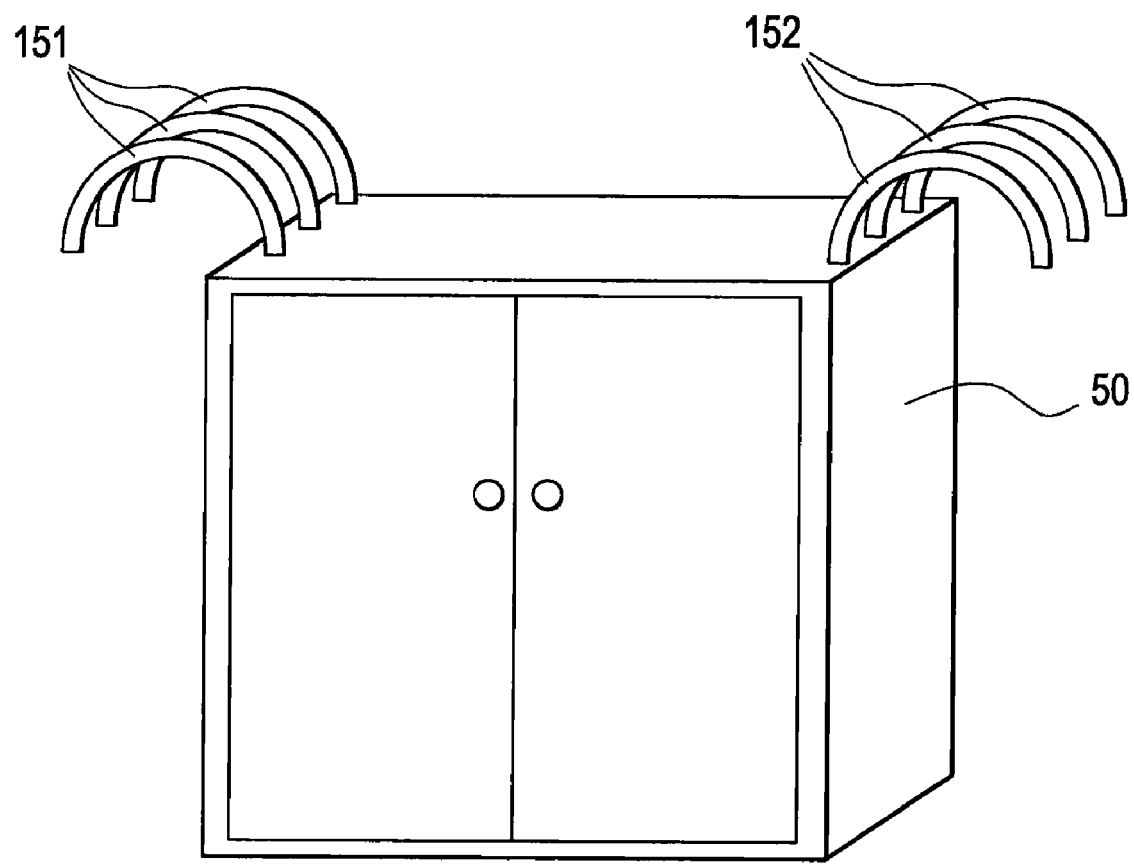
FIG. 5 is a schematic illustration of a closed equipment cabinet in which an arc flash detector according to an embodiment disclosed herein might be used.
Figure 6:
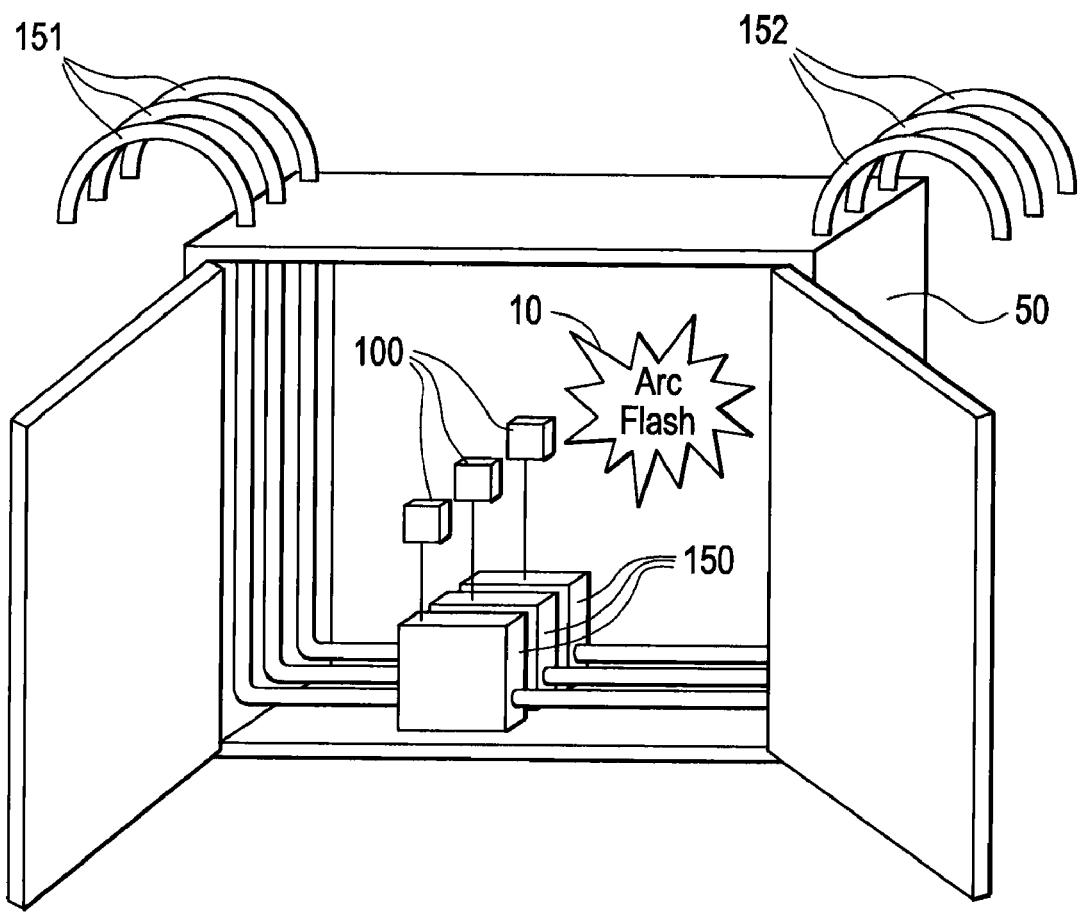
FIG. 6 is a schematic illustration of the equipment cabinet of FIG. 6 with the doors open to schematically illustrate equipment, such as circuit interrupters, within.

FIG. 5 is a schematic illustration of a closed equipment cabinet 50 in which an arc flash detector 100 according to an embodiment disclosed herein might be used. Line conductors 151 enter the cabinet, and load conductors 152 exit the cabinet. As seen schematically in FIG. 6, a circuit interrupter 150 is in the equipment cabinet 50 for each line/load conductor pair 151/152, and at least one arc flash detector 100 is connected to the circuit interrupters 150 via respective third paths 131, such as wires or other electrical conductors. In the event of an arc flash 10 in the cabinet 50, at least one arc flash detector 100 produces an output signal conveyed by the third path 131 to trip the appropriate circuit interrupters 150. This stops current in the cabinet, terminating the arc.

Figure 7:
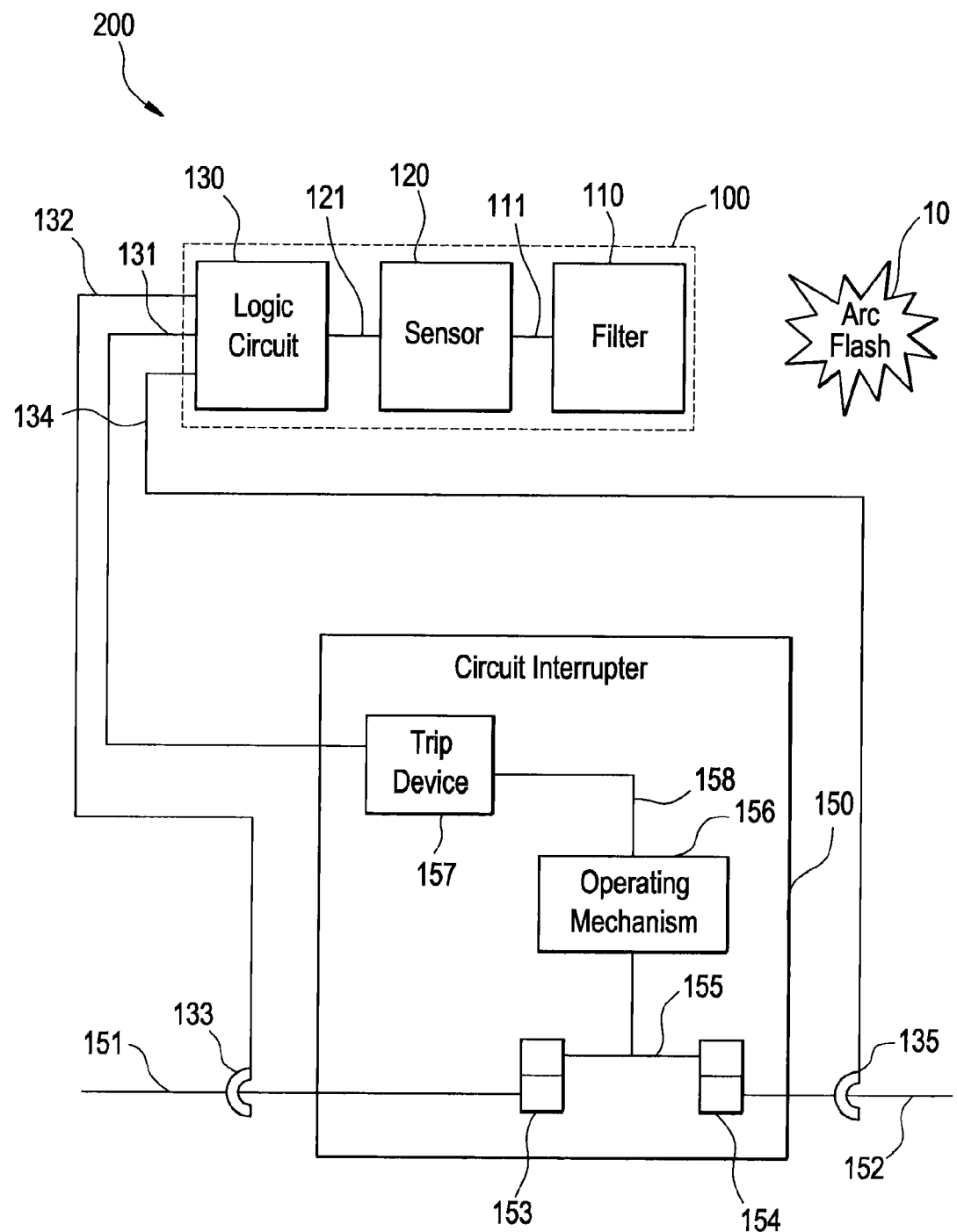
FIG. 7 is a schematic illustration of a power equipment protection system including an arc flash detector according to an embodiment disclosed herein.
Figure 8:
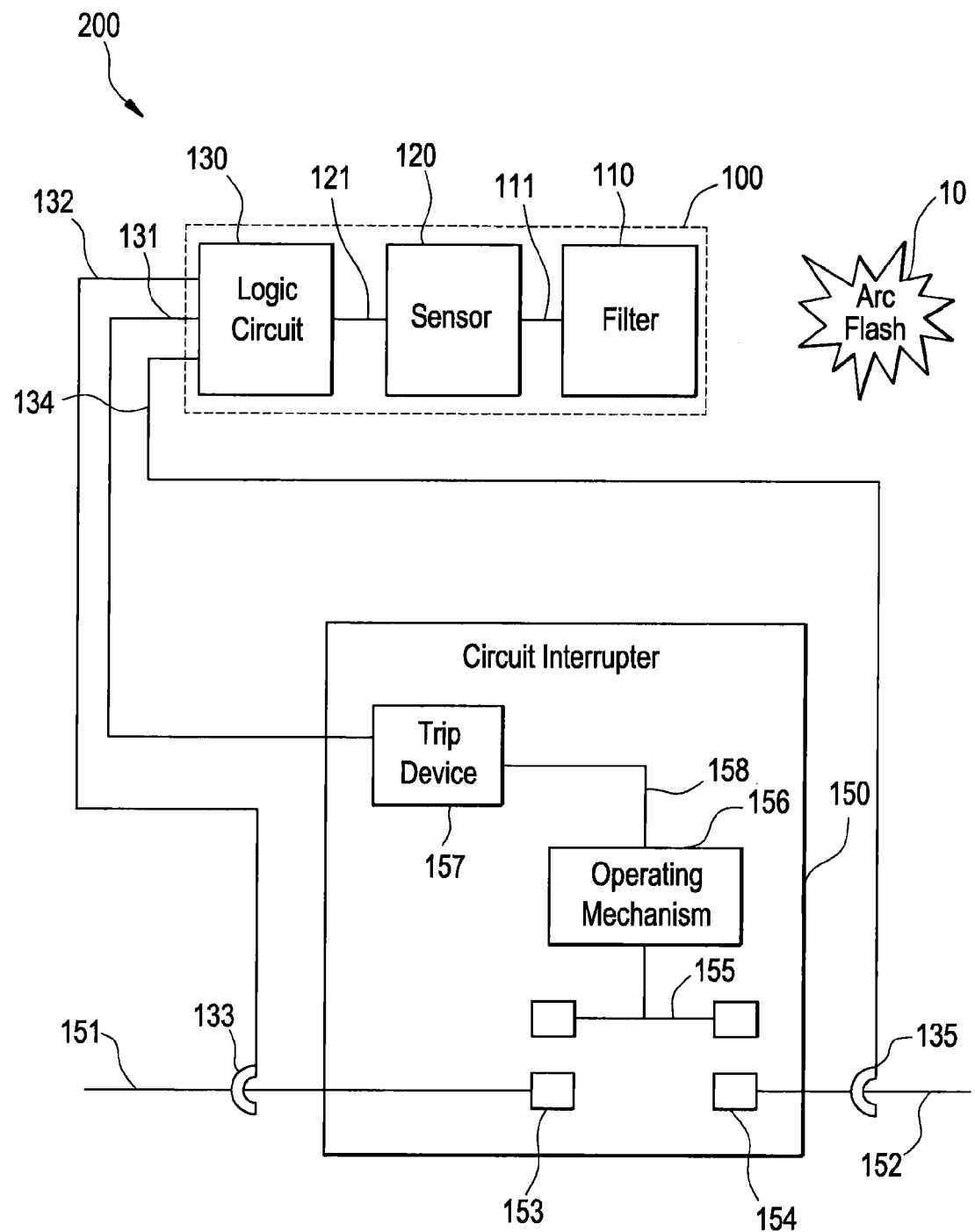
FIG. 8 is a schematic illustration of the power equipment protection system of FIG. 7 with the interrupter having been tripped.

FIGS. 7 and 8 provide a schematic illustration of a power equipment protection system 200 including an arc flash detector 100 according to an embodiment as disclosed herein. As shown in FIG. 7, the line conductor 151 is connected to a line contact 153 of the circuit interrupter 150, and the load conductor 152 is connected to a load contact 154 of the circuit interrupter 150. In normal operation, a movable contact arm 155 connects the line contact 153 and the load contact 154 to permit current flow from line conductor 151 to load conductor 152. An operating mechanism 156 is connected to the movable contact arm 155 and moves the movable contact arm 155 away from the line and load contacts 153, 154 when operated to interrupt current flow, as shown schematically in FIG. 8. The operating mechanism 156 is responsive to a trip device 157 via an operable connection 158. In embodiments, the trip device 157 is an electromechanical trip device and the operable connection 158 is a mechanical connection between the trip device 157 and the operating mechanism 156. Other trip devices 157 and operable connections 158 are contemplated within the scope of embodiments.

The trip device 157 receives the third path 131 from the logic circuit 130 of the arc flash detector 100. In the event of an arc flash 10, enough light penetrates the light attenuating filter 110 and travels the first path 111 to the light sensor 120 that the light sensor 120 generates an output signal. The second path 121 conveys the output signal of the light sensor 120 to the logic circuit 130. The logic circuit 130, when it determines that an arc flash 10 has occurred, sends an output signal to the trip device 157 via the third path 131. For example, the logic circuit 130 in embodiments generates a trip signal that causes the trip device 157 to actuate the operating mechanism 156 via the operable connection 158, moving the movable contact arm 155 to stop current flow through the circuit interrupter 155, as shown schematically in FIG. 8.

In embodiments, as seen in the schematic example of FIGS. 7 and 8, the logic circuit 130 receives line information and/or load information via fourth and/or fifth paths 132, 134 from a respective line/load information providing device 133, 135. For example, the line/load information can be indicative of a magnitude or amplitude of current traveling through the respective conductor 151, 152, the line/load information providing device 133, 135 being a current sensor. Alternatively, the line/load information could be indicative of a voltage, the line/load information providing device 133, 135 being a voltage sensor. Additional types of information could be provided by appropriate devices as required for a particular application of embodiments. The logic circuit 130 uses the line/load information in determining whether an arc flash event has actually occurred. While both line and load information are shown as being provided to the logic circuit 130 in FIGS. 7 and 8, only one can be used within the scope of embodiments. Additionally, the line information could be indicative of a different property than the load information. For example, the line information could be indicative of line voltage, while the load information could be indicative of load current strength, or vice versa.

Figure 9:
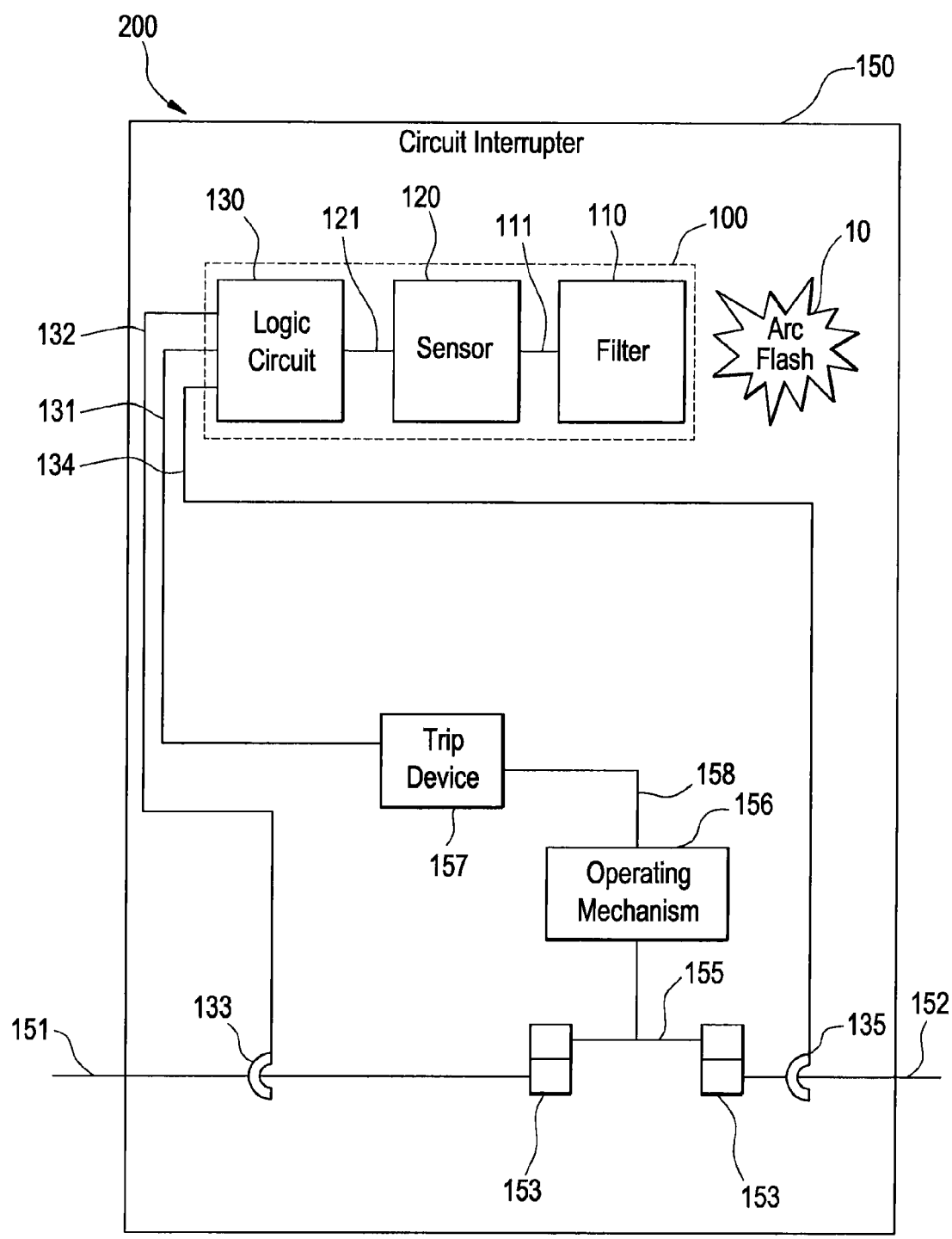
FIG. 9 is a schematic illustration of a power equipment protection system including an arc flash detector according to an embodiment disclosed herein.
Figure 10:
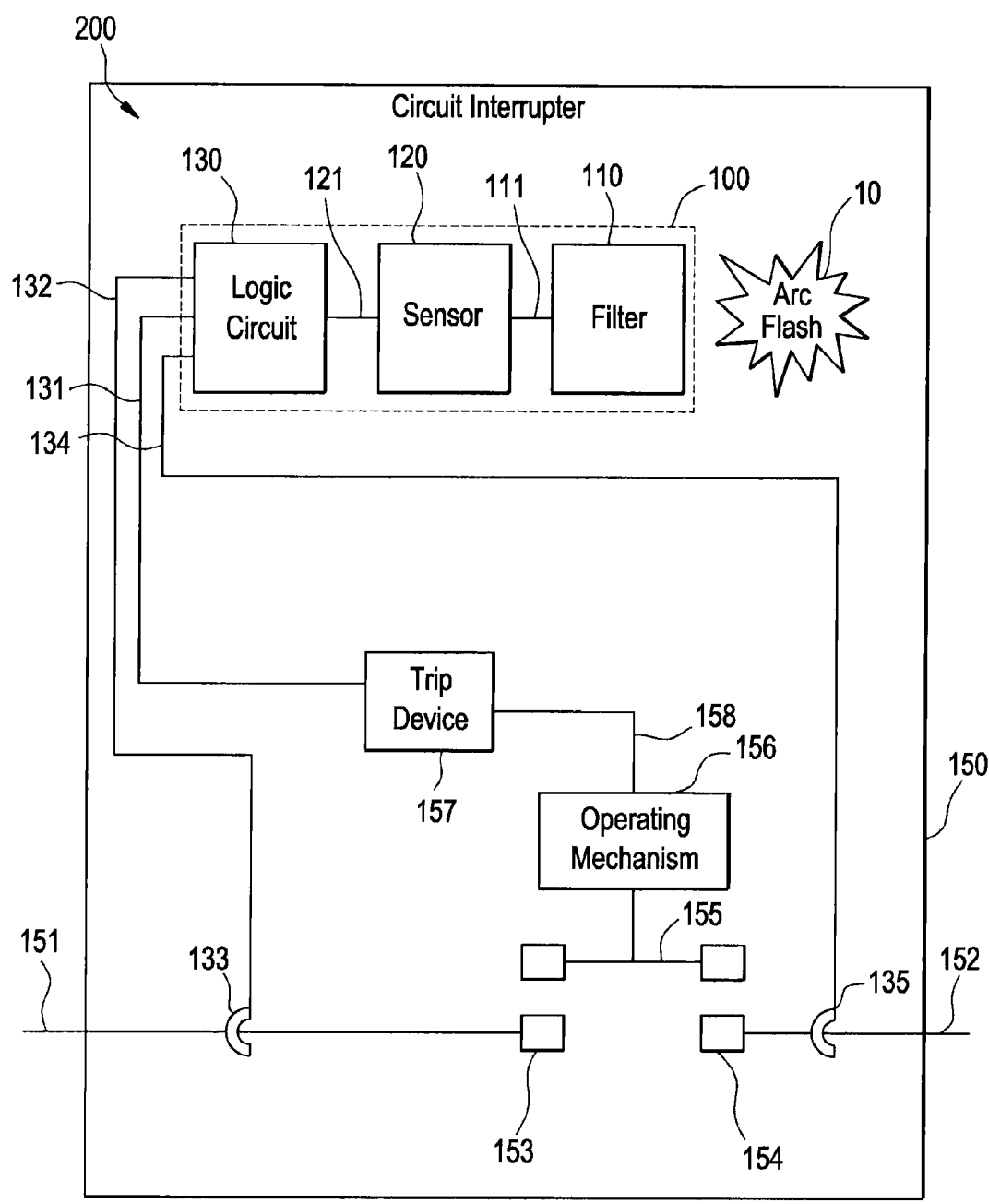
FIG. 10 is a schematic illustration of the power equipment protection system of FIG. 9 with the interrupter having been tripped.
Figure 9:
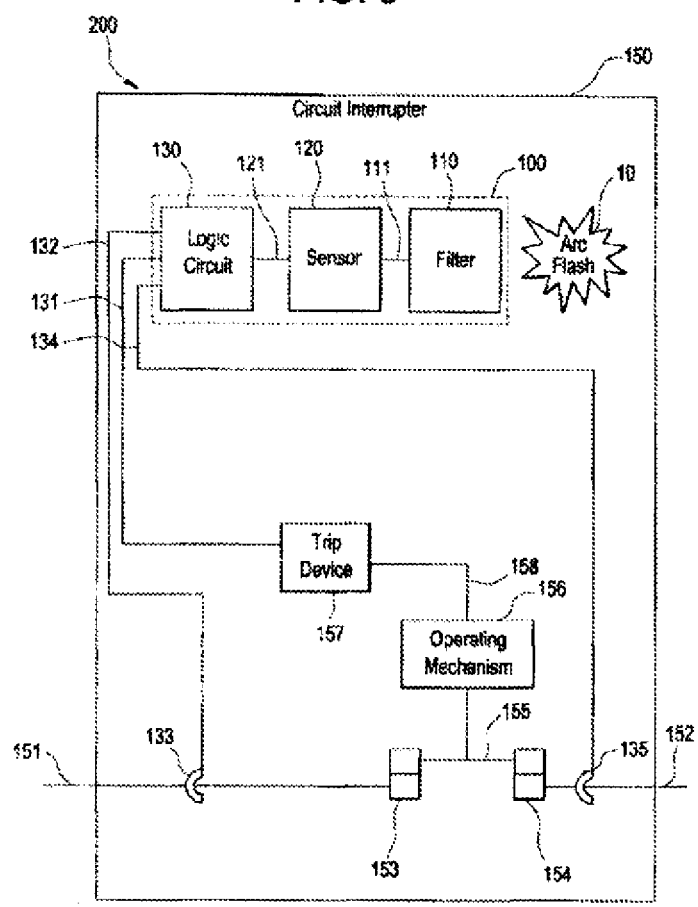

While the power equipment protection system 200 is shown as having the arc flash detector 100 outside the circuit interrupter 150 in FIGS. 7 and 8, embodiments use an arc flash detector inside the circuit interrupter 150, as seen schematically in FIGS. 9 and 10. Apart from location, and perhaps actual size, there is no difference between the example shown in FIGS. 7 and 8 and the example shown in FIGS. 9 and 10 as far as parts and function. The arc flash detector 100 in the example of FIGS. 9 and 10 is responsive to arc flashes 10 within the circuit interrupter 150, while the arc flash detector 100 in the example of FIGS. 7 and 8 is responsive to arc flashes 10 outside, or extending from within, the circuit interrupter 150.

The logic circuit 130 in embodiments performs a method to determine whether an arc flash 10 has occurred. For example, the logic circuit can include a computer processor connected to a computer readable storage medium containing computer executable code that, when executed by the computer processor, causes the processor to perform a method including monitoring a connection to a light sensor, comparing an output signal of the light sensor to a predetermined value, and sending an arc flash event signal if the output signal of the light sensor exceeds the predetermined value. In embodiments, the method can further include comparing line information to a predetermined value and/or comparing load information to a predetermined value. In embodiments in which line and/or load information is compared to a respective predetermined value, sending an arc flash event signal is only done if the line and/or load information also exceeds the respective predetermined value.

The flow diagrams depicted herein are just one example. There may be many variations to the diagrams or the steps (or operations) described therein without departing from the spirit of the invention. For instance, the steps may be performed in a differing order or steps may be added, deleted or modified. All of these variations are considered a part of the claimed invention.

Therefore as described above, several aspects and embodiments of the present invention are readily apparent and provide many advantages over conventional systems. According to one aspect of the invention, an arc flash detector includes a light sensor, a light attenuating filter in communication with the light sensor, a housing disposed to support the light attenuating filter and the light sensor, and a logic circuit in communication with the light sensor. The logic circuit is disposed to receive an output of the light sensor and disposed to produce an output signal responsive to a predetermined intensity of light received by the light sensor. The light attenuating filter is disposed to reduce the intensity of light received by the light sensor. The housing is also disposed to retain the light sensor and the light attenuating filter at a fixed orientation.

According to another aspect of the invention, a power equipment protection system includes a cabinet, a circuit interrupter in the cabinet, and an arc flash detector. The circuit interrupter is positioned within the cabinet. The circuit interrupter includes a line terminal arranged for connection to a line conductor and a load terminal arranged for connection to a load conductor, the circuit interrupter further includes a first contact connected to one of the line and load terminals, a second contact connected to the other of the line and load terminals, an operating mechanism connected to at least one of the first and second contacts so as to selectively place the first and second contacts into and out of engagement with each other, and a trip device connected to the operating mechanism such that when tripped, the trip device causes the operating mechanism to disengage the first and second contacts. The arc flash detector is in communication with the trip device and is disposed to actuate the trip device in response to an arc flash event. The arc flash detector includes a light sensor and a light attenuating filter, the light attenuating filter is disposed to reduce the intensity of light received by the light sensor.

According to yet another aspect of the invention, a power equipment protection system comprising a logic circuit connected to a light sensor, a light attenuating filter covering the light sensor such that ambient light is attenuated by a predetermined percentage before reaching the light sensor, the logic circuit comprising a processor connected to a computer readable storage medium containing computer executable code that, when read and executed by the processor, causes the logic circuit to perform a method. The method includes monitoring an output signal of the light sensor and producing an arc flash event signal if the output signal of the light sensor exceeds a predetermined level.

Additionally, any or all aspects of the invention may be implemented with computer processor hardware and computer software and/or computer program products arranged to store, read, and execute computer code, such as object code, source code, or executable code. Thus, an embodiment of the invention includes computer-implemented processes or methods and apparatus for practicing such processes, such as the controller, which can include a computer processor. Embodiments that include a computer software application or program product that includes computer code, such as object code, source code, or executable code, have the computer software application or program product on a storage device that includes tangible, computer readable media, such as magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), electrically erasable programmable read only memory (EEPROM), or any other computer readable storage medium on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments. For example, the method as described above when implemented as computer software and executed on a processor creates respective means for performing the steps of the method. A technical effect of the executable instructions is to trip a circuit interrupter, initiate an alarm, and/or take other action in response to a determination that an arc flash event has occurred.

The computer program code is written in computer instructions executable by the computer processor, such as in the form of software encoded in any programming language. Examples of suitable programming languages include, but are not limited to, assembly language, VHDL (Verilog Hardware Description Language), Very High Speed IC Hardware Description Language (VHSIC HDL), FORTRAN (Formula Translation), C, C++, C#, Java, ALGOL (Algorithmic Language), BASIC (Beginner All-Purpose Symbolic Instruction Code), APL (A Programming Language), ActiveX, HTML (HyperText Markup Language), XML (eXtensible Markup Language), and any combination or derivative of one or more of these.

While the invention has been described with reference to exemplary embodiments which include the best mode, it will be understood that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. An arc flash detector comprising:
a light sensor;
a light attenuating filter in communication with the light sensor, the light attenuating filter configured and operative to reduce the intensity of light received by the light sensor by a predetermined percentage and to pass a predetermined level of arc flash light needed to effect saturation of the light sensor;
a housing disposed to support the light attenuating filter and the light sensor, the housing further disposed to retain the light sensor and the light attenuating filter at a fixed orientation; and
a logic circuit in communication with the light sensor, the logic circuit disposed to receive an output of the light sensor and disposed to produce an output signal responsive to the predetermined level of arc flash light received by the light sensor.

2. The arc flash detector of claim 1 wherein the light sensor is a photodiode, a phototransistor, or a light-to-voltage device.

3. The arc flash detector of claim 1 further comprising an adhesive layer between the light sensor and the light attenuating filter disposed to affix the light attenuating filter to the light sensor at a predetermined distance.

4. The arc flash detector of claim 1 further comprising an optic waveguide between the light sensor and the light attenuating filter, the optical waveguide disposed to guide attenuated light from the light attenuating filter to a sensing surface of the light sensor.

5. The arc flash detector of claim 4 wherein the optical waveguide is fiber optic cable, translucent adhesive, transparent adhesive, or an optical lens.

6. The arc flash detector of claim 1 wherein the light attenuating filter attenuates light passing therethrough in a range of from about 0.4% to about 8.5%.

7. The arc flash detector of claim 6 wherein the light attenuating filter attenuates light passing therethrough in a range of from about 1.2% to about 3.2%.

8. The arc flash detector of claim 1 wherein the light attenuating filter comprises welding shade material in a grade range of 3 to 6.

9. The arc flash detector of claim 1 wherein the logic circuit is disposed to receive a line current signal indicative of a line current and is further disposed to use the line current signal to determine if an arc flash event has occurred.

10. The arc flash detector of claim 1, further comprising a circuit interrupter in communication with the logic circuit.

11. The arc flash detector of claim 10, wherein the light attenuating filter, the light sensor, and the housing are positioned within a housing of the circuit interrupter.

12. The arc flash detector of claim 1, wherein the light sensor is configured to transmit an output signal to the logic circuit if attenuated ambient light reaching the light sensor is of sufficient intensity to saturate the light sensor.

13. A power equipment protection system comprising:
a cabinet;
a circuit interrupter positioned within the cabinet, the circuit interrupter comprising a line terminal arranged for connection to a line conductor and a load terminal arranged for connection to a load conductor, the circuit interrupter further comprising a first contact connected to one of the line and load terminals, a second contact connected to the other of the line and load terminals, an operating mechanism connected to at least one of the first and second contacts so as to selectively place the first and second contacts into and out of engagement with each other, and a trip device connected to the operating mechanism such that when tripped, the trip device causes the operating mechanism to disengage the first and second contacts; and
an arc flash detector in communication with the trip device and disposed to actuate the trip device in response to an arc flash event, the arc flash detector comprising a light sensor and a light attenuating filter, the light attenuating filter configured and disposed to reduce the intensity of light received by the light sensor by a predetermined percentage to pass a predetermined level of arc flash light needed to effect saturation of the light sensor.

14. The power equipment protection system of claim 13 wherein the arc flash detector further comprises a logic circuit in electrical communication with the light sensor and disposed to determine whether an arc flash event has occurred based on a signal from the light sensor.

15. The power equipment protection system of claim 14 wherein the logic circuit is disposed to receive at least one of a line information signal and a load information signal, the line information signal and the load information signal are each disposed to convey information about a characteristic of a respective one of a line conductor and a load conductor, the logic circuit further being disposed to include the at least one signal in determining whether an arc flash event has occurred.

16. The power equipment protection system of claim 13 wherein the light sensor is disposed to send a signal when the arc flash detector is exposed to at least 10,000 lux.

17. The power equipment protection system of claim 16 wherein the light sensor is disposed to send a signal when the arc flash detector is exposed to at least 50,000 lux.

18. The power equipment protection system of claim 13, wherein the arc flash detector is positioned inside a housing of the circuit interrupter.

19. The power equipment protection system of claim 13, wherein the arc flash detector includes a plurality of light sensors arranged behind the light attenuating filter in an array format.

20. A power equipment protection system comprising a logic circuit connected to a light sensor, a light attenuating filter covering the light sensor and operative to reduce the intensity of light received by the light sensor by a predetermined percentage and to pass a predetermined level of arc flash light needed to effect saturation of the light sensor, the logic circuit comprising a processor connected to a computer readable storage medium containing computer executable code that, when read and executed by the processor, causes the logic circuit to perform a method comprising:

monitoring an output signal of the light sensor; and producing an arc flash event signal if the output signal of the light sensor exceeds the predetermined level.

21. The power equipment protection system of claim 20, wherein the method further includes at least one of comparing line information to a predetermined value and comparing load information to a predetermined value and determining if an arc flash event has occurred based on the determining.

22. The power equipment protection system of claim 21, wherein the arc flash event signal is produced if one of the line information and load information exceeds a respective predetermined value and the output signal of the light sensor exceeds a respective predetermined value.

* * * * *

UNITED STATES PATENT AND TRADEMARK OFFICE
CERTIFICATE OF CORRECTION

PATENT NO. : 8,223,466 B2
APPLICATION NO. : 12/494648
DATED : July 17, 2012
INVENTOR(S) : George William It is certified that error appears in the above-identified patent and that said Letters Patent is hereby corrected as shown below:

The sheet of drawing consisting of Figure 9 should be deleted to appear as per attached Figure 9.

In fig. 10 Sheet 8 of 8 Reference Tag "200", place Tag "200" outside the box.

Signed and Sealed this
Twenty-third Day of October, 2012

David J. Kappos
*Director of the United States Patent and Trademark Office*